March 17, 1959  A. J. SCHWEMIN  2,878,401
HIGH VOLTAGE GENERATOR
Filed Dec. 13, 1956
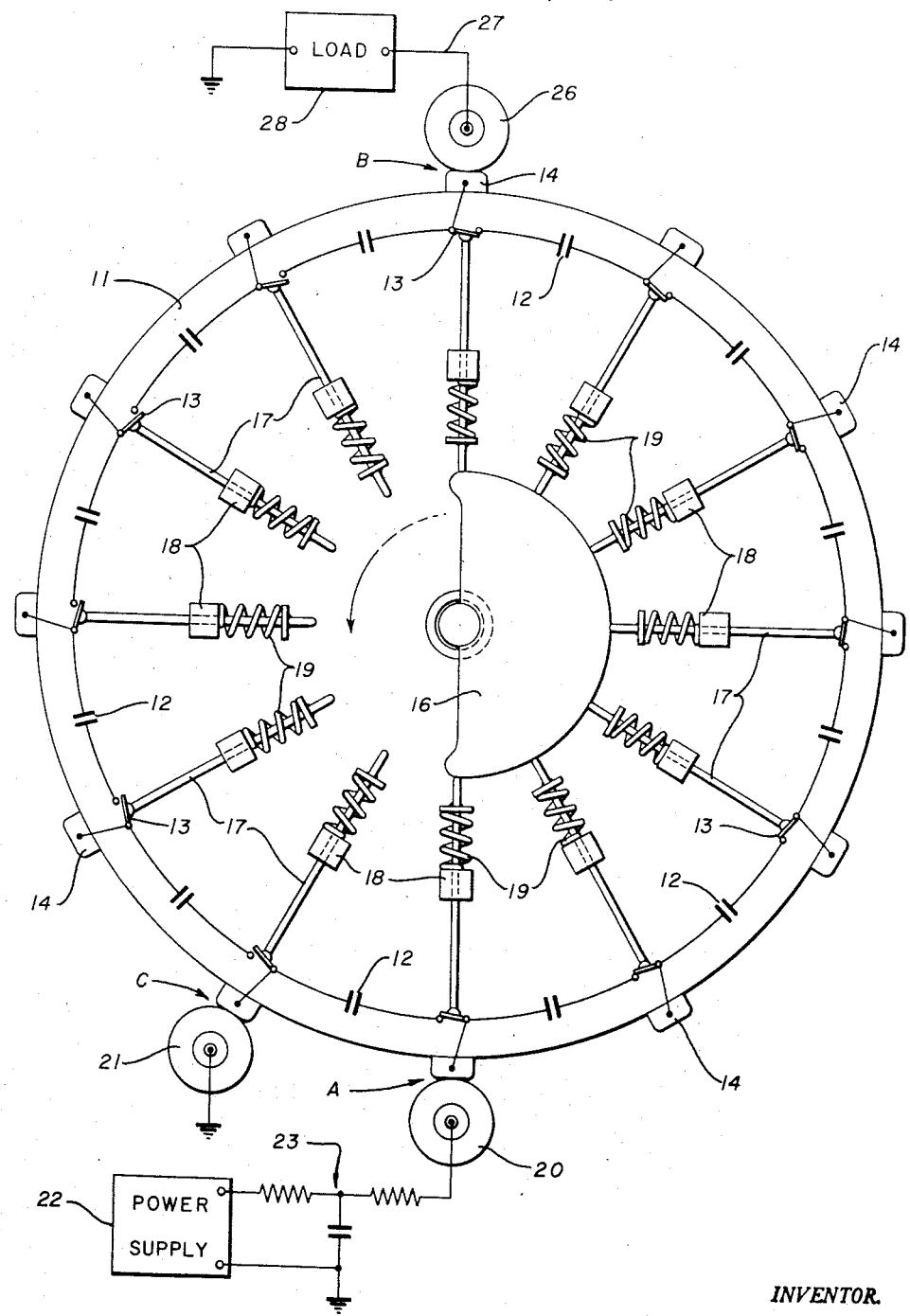
INVENTOR.
ARNOLD J. SCHWEMIN
BY
Roland G. Anderson
ATTORNEY.

2,878,401
HIGH VOLTAGE GENERATOR

Arnold J. Schwemin, Oakland, Calif., assignor to the United States of America as represented by the United States Atomic Energy Commission Application December 13, 1956, Serial No. 628,207

4 Claims. (Cl. 307—110)

The present invention relates to an improved generator for high voltages and embodies means for producing relatively large currents at the high voltage generated so as to be particularly adapted for high voltage applications wherein substantial amounts of power are required.

There have been developed numerous types of electrostatic generators such as, for example, the Van de Graaff generator for attaining very high voltages; however, these machines are limited currentwise and generally produce at most some milliamperes of current even for relatively large machines. The present invention is somewhat analogous to known electrostatic machines in that physical transportation of electrical charges is made from a point of low potential to that of a high potential; however, it operates to move relatively large charges.

It is an object of the present invention to provide an improved high voltage generator.

It is another object of the present invention to provide a high voltage generator developing substantial currents at high voltages.

It is a further object of the present invention to provide moving capacitor apparatus with capacitor switching for developing substantial currents at high voltages.

It is yet another object of the present invention to provide an improved high voltage generator of inexpensive construction and without current limitations.

Numerous other advantages and possible objects of the invention will become apparent to those skilled in the art from the following description taken together with the accompanying drawing wherein the sole figure is a schematic representation of a preferred embodiment of the invention.

The invention in general comprises a closed circuit loop including a plurality of capacitors connected in series by a plurality of switches alternately disposed with the capacitors. The above-noted circuit is mounted for motion past a pair of displaced points with means for charging capacitors individually at one point and means for discharging capacitors collectively at the other point. Switch control means operate to sequentially open and close capacitor switches so as to maintain a high potential between the aforementioned points.

Considering now the invention in some detail and referring to the drawing, there will be seen to be provided an insulating wheel 11 mounted for rotation and carrying thereon in spaced relation about the periphery thereof a plurality of capacitors 12 connected together by alternately disposed switches 13. A plurality of metal contact blocks 14 are disposed about the wheel 11 extending radially therefrom with each switch 13 having one terminal thereof electrically connected to one contact 14.

Means are provided for controlling switch actuation in the form of a stationary cam 16 disposed concentric with the wheel and having a circular outer surface extending over 180 degrees of arc between a pair of opposite points A and B adjacent the wheel periphery whereat capacitor charging and discharging is accomplished. The cam 16 has a lesser diameter than the wheel and is disposed radially inward from the switches 13 thereon, switch actuation from the cam being accomplished by push rods 17 affixed one to each switch arm and extending radially inward of the wheel as in guides 18 for contact by the cam 16. The rods 17 are pivotally mounted on the switch arms and the switches are maintained normally open as by springs 19 connected one to each push rod and bearing on the guide 18. It will be appreciated that as the wheel 11 rotates carrying the capacitors and connecting switches, the switch push rods successively contact the cam 16 and are depressed radially outward of the wheel to close the respective switch. Similarly, push rods turning away from the cam move out of contact therewith whereupon the push rod spring 19 urges the rod radially inward of the wheel to open the respective switch. As the cam surface extends for 180°, oppositely disposed switches on the wheel are both closed at the same time and with an even number of capacitors evenly spaced this means that two more capacitors are closed than are open at any given time except between times of cam-rod contact at the cam ends.

Capacitor charging is accomplished at a point A, for example, by means of a stationary contact such as a small wheel 20 mounted for rotation in position to engage the contact blocks 14 on the wheel 11 as the latter rotates past the point A. A second contact wheel 21 connected to electrical ground is disposed to the left of wheel 20 at a point C such that the wheels contact adjacent blocks 14 at the same time. A charging power supply 22 is connected through a resistance-capacitance network 23 between the contact wheel 20 and ground and will be seen to thus be connected across the capacitor 12 between points A and C for charging same.

The high voltage end of the device may be connected to any desired equipment and need only include a contact such as a rotary-mounted contact wheel 26 disposed in position to engage the contact blocks 14 of the wheel 11. An electrical lead 27 from the high voltage contact wheel 26 is adapted for connection through a load 28 to ground.

With regard to operation of the invention, the wheel 11 is rotated preferably at a constant speed by such as an electric motor connected thereto by belt, friction drive, or the like. The cam 16 is stationary so that as a switch on the wheel approaches point A the switch rod 17 contacts the cam and is depressed thereby radially outward of the wheel to close the switch. At this same time another switch approaches point B with the rod thereof holding same closed and after passing point B the rod loses contact with the cam so that the switch spring 19 opens the switch. It will thus be seen that all of the switches on the right side of the wheel 11 opposite the cam 16 are closed to connect the capacitors there situated in series, while all of the switches on the left side of the wheel are open so that the capacitors are there electrically isolated.

As a switch rotates to point A and is closed, the power supply 22 is connected through the contact wheel 21 and contact block 14 to the capacitor 12 immediately to the left of the switch for charging same, with a ground return completing the charging circuit from point C on the other side of the capacitor being charged. Assuming the capacitor to be charged to X volts, continued rotation of the wheel to the point where the originally charged capacitor is at point B places point B at a potential of X times $n$, the number of capacitors between C and B. There is thus maintained at point B a potential $nX$ and it is at this potential that current is drawn from individual capacitors for energizing the load. As soon as an individual capacitor has been discharged sufficiently at point B, it is disconnected from the discharge circuit and from the other capacitors in the manner aforementioned, and in this discharged state is transported back to point A for recharging. Although it is desirable in certain aspects to totally discharge each capacitor at point B, it has been found most practical to only partially discharge each capacitor and it will be seen that the power supply then operates only to recharge the capacitors to the original level. Consequently, if no load is provided, as during a certain phase of particular operations, no charging current is drawn and the only energy expended is the small amount required to rotate the wheel.

Numerous variations of the invention are possible, as for example at the points A and B where the contact wheels are provided to reduce the arcing associated with sliding contacts. Additional provision may be made in this respect as by segmenting the contact wheels with alternate conducting and nonconducting portions so that the former contacts only the center of the contact blocks 14, or by providing inductance in the charging circuit in addition to the network 23, or even by providing controlled switching means such as an ignitron in the charging circuit controlled to conduct only when the wheel 21 is in full engagement with a contact block 14.

A practical and useful device embodying the invention may employ a wheel some feet in diameter with dozens of capacitors individually charged upwardly of a thousand volts so as to provide a load current in the range of one ampere at some two million volts.

While the salient features of the present invention have been described in detail with respect to a single preferred embodiment, it will be apparent that numerous modifications may be made within the spirit and scope of the invention and it is therefore not desired to limit the invention to the exact details shown except insofar as they may be defined in the following claims.

What is claimed is:

1. A high voltage generator comprising a plurality of capacitors, a plurality of switches alternately disposed with said capacitors for connecting same, means for moving said capacitors past a pair of spaced points, capacitor charging means disposed at one of said points, capacitor discharging means disposed at the other of said points, and switch control means maintaining all switches closed connecting charged capacitors and all switches open connecting discharged capacitors.

2. A high voltage generator comprising a plurality of capacitors, a plurality of switches alternately disposed with said capacitors and connecting same in a closed loop, means moving said capacitor loop continuously past a pair of spaced points, means for charging each capacitor passing one of said points and means for discharging capacitors passing the other point, and switch control means for closing switches between all capacitors passing from the charging point to the discharging point and opening switches between all capacitors passing from the discharging point to the charging point.

3. A high voltage generator as defined in claim 2 further defined by said points being diametrically opposed on said wheel, and said switch control means including a plurality of switch actuating rods extending radially of said wheel and a stationary cam having a cam surface extending at least one hundred and eighty degrees of wheel arc with which said rods engage for switch actuation.

4. A high voltage generator comprising a wheel mounted for rotation, means for rotating said wheel, a plurality of capacitors spaced about the circumference of said wheel in insulated relation thereto, a plurality of switches disposed with one between each pair of adjacent capacitors and electrically connected therebetween, contact means about the periphery of said wheel connected separately to individual switches, a pair of fixed contacts disposed diametrically opposite of said wheel and adjacent thereto for engaging successive wheel contacts as the wheel rotates, charging means connected to one of said fixed contacts and discharging means connected to the other fixed contact, and switch control means including a fixed cam having a surface extending semicircularly between said fixed contacts and engaging said switches to close the switches traveling from the charging contact to the discharge contact and opening the switches traveling from the discharge contact to the charging contact.

References Cited in the file of this patent
UNITED STATES PATENTS

| | | |
|---|---|---|
| 2,462,804 | Canady | Feb. 22, 1949 |
| 2,716,707 | Kuecken | Aug. 30, 1955 |